(12) United States Patent
Snider et al.

(10) Patent No.: US 10,291,559 B1
(45) Date of Patent: May 14, 2019

(54) SYSTEMS AND METHOD FOR COMMUNICATIONS ROUTING BASED ON ELECTRONIC COMMUNICATION DATA

(71) Applicant: Notion AI, Inc., Ann Arbor, MI (US)

(72) Inventors: Lindsay Snider, Ann Arbor, MI (US); Guy Suter, Ann Arbor, MI (US); Ian Berry, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 0 days.

(21) Appl. No.: 16/182,077

(22) Filed: Nov. 6, 2018

Related U.S. Application Data

(60) Provisional application No. 62/612,809, filed on Jan. 2, 2018, provisional application No. 62/582,639, filed on Nov. 7, 2017.

(51) Int. Cl.
| | |
|---|---|
| *G06N 20/00* | (2019.01) |
| *H04L 12/24* | (2006.01) |
| *H04L 12/58* | (2006.01) |
| *H04L 29/08* | (2006.01) |
| *G06F 16/248* | (2019.01) |
| *G06F 16/2457* | (2019.01) |

(52) U.S. Cl.
CPC ............ *H04L 51/04* (2013.01); *G06F 16/248* (2019.01); *G06F 16/24578* (2019.01); *G06N 20/00* (2019.01); *H04L 41/22* (2013.01); *H04L 67/10* (2013.01); *H04L 67/16* (2013.01)

(58) Field of Classification Search
None
See application file for complete search history.

(56) References Cited

U.S. PATENT DOCUMENTS

| | | |
|---|---|---|
| 8,909,646 B1 | 12/2014 | Fabrikant et al. |
| 9,749,277 B1 | 8/2017 | Kaufmann et al. |
| 2010/0306305 A1* | 12/2010 | DeHaan ............. H04L 41/0853 709/203 |
| 2013/0018954 A1 | 1/2013 | Cheng |
| 2013/0339142 A1 | 12/2013 | Hewinson |
| 2014/0188862 A1 | 7/2014 | Campbell et al. |
| 2014/0280121 A1 | 9/2014 | Sharp et al. |

(Continued)

*Primary Examiner* — Brian Whipple
(74) *Attorney, Agent, or Firm* — Jeffrey Schox; Padowithz Alce

(57) ABSTRACT

A system and method includes at the online electronic communications service: receiving a search query from a source communication node; accessing historical electronic communication data associated with the source communication node and a plurality of online communication nodes from one or more third-party online communication services; constructing an electronic communication network mapping of communication nodes between the source communication node and each of the plurality of online communication nodes, wherein constructing includes: measuring communication metrics and/or connectivity metrics among the source communication node and the plurality of online communication nodes at least one communication metric or at least one connectivity metric between pairs of online communication nodes within the electronic communication network mapping based on the measuring; and returning an identification of one or more online communication nodes that satisfy one or more search facets of the search query based on the electronic communication network mapping.

20 Claims, 6 Drawing Sheets

200

Receiving a Search Query S210

Identifying Datasets S220

Selecting Path Optimization S230

Identifying Optimal Path S240

(56) References Cited

U.S. PATENT DOCUMENTS

| | | | |
|---|---|---|---|
| 2015/0278372 A1* | 10/2015 | Balooshi | G06F 16/9535 |
| | | | 707/706 |
| 2015/0294016 A1* | 10/2015 | Spielthenner | G06F 7/24 |
| | | | 707/723 |
| 2015/0302444 A1 | 10/2015 | Sundaresan | |
| 2015/0334077 A1* | 11/2015 | Feldman | H04L 51/32 |
| | | | 715/744 |
| 2016/0034853 A1 | 2/2016 | Wang et al. | |
| 2017/0078322 A1* | 3/2017 | Seiver | H04L 43/0876 |
| 2017/0351417 A1 | 12/2017 | Manico et al. | |
| 2018/0012139 A1 | 1/2018 | Schmid et al. | |
| 2018/0144256 A1 | 5/2018 | Saxena et al. | |
| 2018/0349347 A1 | 12/2018 | Ringger et al. | |

* cited by examiner

200

Receiving a Search Query S210

Identifying Datasets S220

Selecting Path Optimization S230

Identifying Optimal Path S240

SYSTEMS AND METHOD FOR COMMUNICATIONS ROUTING BASED ON ELECTRONIC COMMUNICATION DATA

CROSS-REFERENCE TO RELATED APPLICATIONS

This application claims the benefit of U.S. Provisional Application No. 62/612,809, filed 2 Jan. 2018, and of U.S. Provisional Application No. 62/582,639, filed on 7 Nov. 2017 which are incorporated herein in their entireties by this reference.

TECHNICAL FIELD

The inventions relate generally to the electronic communication processing and electronic communication interfaces, and more specifically to new and useful systems and methods for routing between nodes of an electronic communication environment in the electronic communication processing and electronic communication interfaces fields.

BACKGROUND

In many modern contexts, electronic mail (email) is an often-utilized means, if not primary means, of communicating electronically. Now that e-mail communications may be composed and transmitted via numerous communication devices (e.g., mobile phones, wearable devices (e.g., watches), virtual assistive devices, etc.) other than desktops, the amount of e-mail communications received by any given recipient on a single day may easily exceed several hundred emails and probably more than one thousand emails per day. The numerous amount of emails received each day coupled with the additional responses made to some of these emails can overwhelm a user's email account or a viewing device displaying the emails. Specifically, the numerous amount of emails may often overwhelm a user's ability to digest important and/or time-sensitive emails. This, in turn, may cause the user to lose productivity, make mistakes, and/or mishandle one or more important matters.

Thus, there is a need in the electronic communication processing and electronic mail interface field to create new and useful systems and methods for improving efficiencies in email and messaging communications, reducing email and messaging communications, and preserving email and messaging computing resources. The embodiments of the present application provide such new and useful systems and methods.

SUMMARY OF THE INVENTION

In one embodiment, a system that implements an electronic network mapping of online communication nodes within an online communication service includes an online electronic communication service implemented via a distributed networked computing system comprising an electronic communications server that accesses electronic communication data exchanged between a plurality of online users; at the online electronic communications service: receiving, via an online user interface of the online electronic communications service, a search query from a source communication node; accessing historical electronic communication data associated with the source communication node and a plurality of online communication nodes from one or more third-party online communication services, the historical electronic communication data comprising data relating to communications exchanged between two or more online communication nodes operating on the one or more third-party online communication services; constructing, by the online electronic communications service, an electronic communication network mapping of communication nodes between the source communication node and each of the plurality of online communication nodes based on the historical electronic communication data, wherein constructing the electronic communication network mapping includes: measuring a plurality of communication metrics and/or a plurality of connectivity metrics among the source communication node and the plurality of online communication nodes based on the historical electronic communication data; attributing at least one communication metric or at least one connectivity metric between pairs of online communication nodes within the electronic communication network mapping based on the measuring; and returning, via the online user interface of the online communications service, an identification of one or more online communication nodes that satisfy one or more search facets of the search query based on the electronic communication network mapping.

In one embodiment, the system includes at the online communications service: identifying an optimal communication path via the electronic communication network mapping from the source communication node to a selected one of the identified one or more online communication nodes.

In one embodiment, identifying the optimal communication path includes identifying one electronic communication path from a plurality of possible electronic communication paths within the electronic communication network mapping having an average responsiveness metric value that satisfies a predetermined threshold; calculating the average responsiveness metric value includes: aggregating each of a plurality of distinct responsiveness metric values attributed to pairs of online communication nodes along each of the plurality of possible electronic communication paths within the electronic network mapping; and calculating the average responsiveness metric value for each of the plurality of possible electronic communication paths based on a number of distinct responsiveness metric values along each of the plurality of possible electronic communication paths.

In one embodiment, identifying the optimal communication path includes identifying one electronic communication path from a plurality of possible electronic communication paths within the electronic communication network mapping having an average relationship strength metric value that satisfies a predetermined threshold; calculating the average responsiveness metric value includes: aggregating each of a plurality of distinct relationship strength metric values attributed to pairs of online communication nodes along each of the plurality of possible electronic communication paths within the electronic communication network mapping; and calculating the average relationship strength metric value for each of the plurality of possible electronic communication paths based on a number of distinct relationship strength metric values along each of the plurality of possible electronic communication paths.

In one embodiment, a method that implements an electronic network mapping of online communication nodes within an online communication service includes implementing an online electronic communication service via a distributed networked computing system; at the online electronic communications service: receiving, via an online user interface of the online electronic communications service, a search query from a source communication node; accessing historical electronic communication data associated with the source communication node and a plurality of online communication nodes from one or more third-party online communication services, the historical electronic communication data comprising data relating to communications exchanged between two or more online communication nodes operating on the one or more third-party online communication services; constructing an electronic communication network mapping of communication nodes between the source communication node and each of the plurality of online communication nodes based on the historical electronic communication data, wherein constructing the electronic communication network mapping includes: measuring a plurality of communication metrics and/or a plurality of connectivity metrics among the source communication node and the plurality of online communication nodes based on the historical electronic communication data; at least one communication metric or at least one connectivity metric between pairs of online communication nodes within the electronic communication network mapping based on the measuring; and returning, via the online user interface of the online communications service, an identification of one or more online communication nodes that satisfy one or more search facets of the search query based on the electronic communication network mapping.

In one embodiment, the method includes identifying an optimal communication path via the electronic communication network mapping from the source communication node to a selected one of the identified one or more online communication nodes.

In one embodiment, wherein identifying the optimal communication path includes identifying one electronic communication path from a plurality of possible electronic communication paths within the electronic communication network mapping having an average responsiveness metric value that satisfies a predetermined threshold; calculating the average responsiveness metric value includes: aggregating each of a plurality of distinct responsiveness metric values attributed to pairs of online communication nodes along each of the plurality of possible electronic communication paths within the electronic network mapping; and calculating the average responsiveness metric value for each of the plurality of possible electronic communication paths based on a number of distinct responsiveness metric values along each of the plurality of possible electronic communication paths.

In one embodiment, the responsive metric value indicates a level of responsiveness of a first node to a second node to an electronic communication received by the first node from the second node.

In one embodiment, identifying the optimal communication path includes identifying one electronic communication path from a plurality of possible electronic communication paths within the electronic communication network mapping having an average relationship strength metric value that satisfies a predetermined threshold; calculating the average responsiveness metric value includes: each of a plurality of distinct relationship strength metric values attributed to pairs of online communication nodes along each of the plurality of possible electronic communication paths within the electronic communication network mapping; and calculating the average relationship strength metric value for each of the plurality of possible electronic communication paths based on a number of distinct relationship strength metric values along each of the plurality of possible electronic communication paths.

In one embodiment, each of the online communication nodes of the plurality of online communication nodes represented as a distinct node within a graphical representation of the electronic communication network mapping; the method further comprising: selecting a node comprising one of the identified one or more online communication nodes within the graphical illustration of the cohort network mapping; and responsive to the selecting the node, automatically presenting via an interface of an online networking environment one or more options for establishing an electronic communication with the online user and/or routing an electronic message to the online user.

In one embodiment, the electronic communication network mapping comprises a cohort network mapping that identifies electronic connections between a subset of the plurality of online communication nodes defining a cohort grouping; the method further comprising: implementing a machine learning system comprising an ensemble of machine learning classifiers that includes a plurality of distinct machine learning classifiers, wherein each of the plurality of distinct machine learning classifiers is configured to generate a distinct classification label upon a detection of a distinct cohort data feature extracted from the historical electronic communication data, processing the historical electronic communication data, including: generating by the plurality of distinct machine learning classifiers one or more cohort machine learning classification labels for each of the plurality of online communication nodes based on one or more distinct cohort data features of the extracted cohort data features; allowing the one or more cohort machine learning classification labels along with the cohort data features, as input, into a cohort grouping circuit; and identifying the cohort grouping additionally based on the one or more cohort machine learning classification labels.

In one embodiment, the electronic communication network mapping comprises an archetype network mapping that identifies an archetype classification label for each online communication node of a subset of the plurality of online communication nodes within the archetype network mapping, wherein the archetype classification label relates to a predetermined model that represents a type of online user and/or online communication node operating in an electronic communication environment; the method further comprising: implementing a machine learning classification system comprising an ensemble of machine learning classifiers that includes a plurality of distinct machine learning classifiers, wherein each of the plurality of distinct machine learning classifiers is configured to generate a distinct archetype classification label upon a detection of a distinct archetype data feature extracted from the historical electronic communications data, processing the historical electronic communication data, including: generating by the plurality of distinct machine learning classifiers one or more archetype machine learning classification labels for each of the plurality of online communication nodes based on one or more distinct archetype data features of the archetype data features; applying a global archetype classification threshold to the one or more archetype machine learning classification labels; wherein identifying the archetype classification for each of the plurality of online communication nodes includes outputting to the archetype network mapping the archetype classification that maps to the one or more archetype machine learning classification labels that satisfies or exceeds the global archetype classification threshold.

In one embodiment, the global archetype classification threshold relates to a minimum required likelihood or probability that the archetype data features indicate an associated archetype classification label or archetype classification for each of the plurality of online communication nodes.

In one embodiment, the method includes implementing an electronic communication processing circuit that processes the historical electronic communication data, wherein processing the historical electronic communication data includes: extracting, by a feature extractor circuit, communication data features and/or connectivity data features from the historical electronic communication data, wherein measuring the plurality of communication metrics and/or the plurality of connectivity metrics is based on the extracted communication data features and/or connectivity data features.

In one embodiment, the electronic communication network mapping comprises a connectivity link or connectivity edge between disparate pairs of online communication nodes within the electronic communication network mapping, and each of connectivity link or each connectivity edge comprises bi-directional connectivity weights or connection metric values that includes a first metric value indicating a relationship metric value or connection metric value from a perspective of a first node toward a second node in a distinct pair of online communication nodes and a second metric value indicating a relationship metric value or connection metric value from a perspective of the second node toward the first node in the distinct pair of online communication nodes.

In one embodiment, the method includes generating a correlated dataset associated with the source communication node, wherein generating the correlated dataset includes: identifying publicly available data from one or more Internet data sources that is potentially associated with the source communication node, determining whether the publicly available data includes data that is associated with the source communication node by identifying overlapping data points between data points within the historical electronic communication data associated with the source communication node and data points within the publicly available data; the correlated dataset by correlating the historical electronic communication data associated with the source communication node and the publicly available data if the overlapping data points satisfy a predetermined overlapping threshold.

In one embodiment, the method includes selectively enabling or selectively disabling a sharing of the electronic communicating networking mapping with one or more online communication nodes operating with the electronic communication service.

In one embodiment, the method includes selectively enabling or selectively disabling a sharing of the electronic communicating networking mapping with one or more domains and/or one or more cohort groups operating with the electronic communication service.

In one embodiment, the responsive metric value indicates a likelihood that an electronic message is routed efficiently through a given pair of online communication nodes within the electronic communication network mapping.

In one embodiment, an online method that implements an electronic network mapping of online communication nodes within an email environment based on email communication data includes implementing an online electronic communication service via a distributed networked computing system; at the online electronic communications service: receiving, via an online user interface of the online electronic communications service, a search query from a source communication node; accessing historical electronic communication data associated with the source communication node and a plurality of online communication nodes from one or more third-party online communication services, the historical electronic communication data comprising data relating to communications exchanged between two or more online communication nodes operating on the one or more third-party online communication services; constructing an electronic communication network mapping of communication nodes between the source communication node and each of the plurality of online communication nodes based on the historical electronic communication data, wherein constructing the electronic communication network mapping includes: measuring a plurality of communication metrics and/or a plurality of connectivity metrics among the source communication node and the plurality of online communication nodes based on the historical electronic communication data; attributing at least one communication metric or at least one connectivity metric between pairs of online communication nodes within the electronic communication network mapping based on the measuring; and returning, via the online user interface of the online communication s service, an identification of one or more online communication nodes that satisfy one or more search facets of the search query based on the electronic communication network mapping.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed in the above sections, the complications of interfacing and managing electronic communications are varied and great in number. Specifically, email communication users are inundated with countless electronic messages and the existing electronic communication platforms fail to provide useful electronic communication interfaces and electronic communication tools to address the several technical deficiencies thereof.

However, several of the embodiments of the present application, enable enhanced electronic communications by users providing an intelligent electronic communications and messaging platform that harvests useful and intelligent insights from electronic communication histories of the users of the intelligent electronic communication and messaging platform.

As an example, a technical benefit and/or advantage embodied within the one or more of the several embodiments of the present application includes an ability of the intelligent electronic communication platform to detect and/or suggest cohorts of electronic communication users based on advanced machine learning processing and the like of the electronic communication histories of the electronic communication users operating on or using one or more aspects of the described intelligent platform. The detected and/or suggested cohort groups enable intelligent and faster processing, prioritizing, disposing, and electronic communication routing with respect to each member of the respective cohort. That is, using the cohort groups, the intelligent electronic communication platform can automatically implement one or more advanced electronic processing techniques to inbound and outbound electronic communications that reduce or ameliorate the technical inefficiencies and technical problems in handling electronic communications as well as provide electronic communication tools (such as tools for interfacing with the detected cohort grouping). Additionally, specific electronic communication users may function to use the detected cohort groups in electronic communication routing and planning to members within the cohort and/or other electronic communication users that may be external to the cohort group but nevertheless connected to the cohort group based on evaluations of their electronic communication histories.

1. System Architecture

Figure 1:
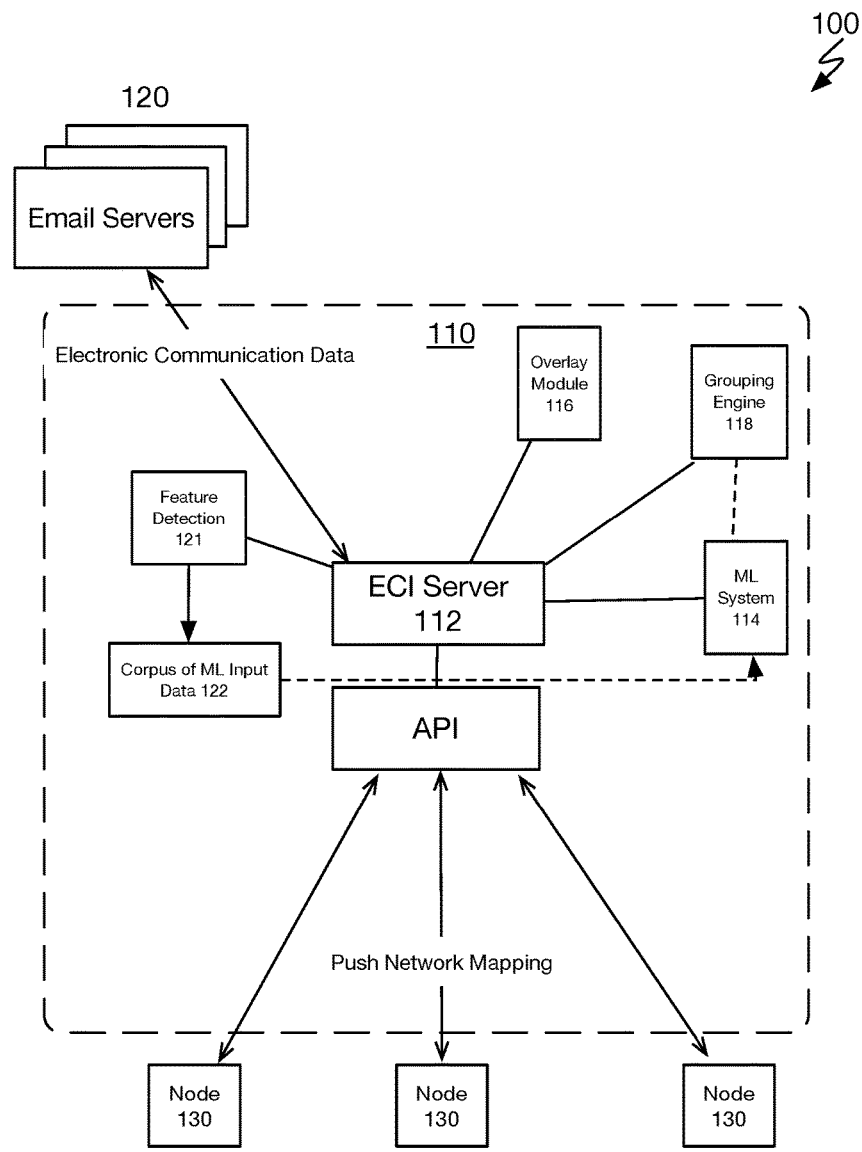
FIG. 1 illustrates a system 100 in accordance with one or more embodiments of the present application.

As shown in FIG. 1, a system 100 for classifying communication nodes operating within an electronic communication environment includes an electronic communication platform 110, a plurality of mail servers 120, and a plurality of communication nodes 130. The electronic communication platform 110 may include an electronic communication integration server 112, a machine learning system 114, an overlay module 116, and a grouping engine 118.

The system 100 functions to provide one or more classifications for a communication node based on (historical or real-time) electronic communications data of the communication node and in some embodiments, activities data of the communication node within the electronic communication environment. A communication node as referred to herein may refer to an electronic communication user and/or a computing system that is operated or used by an electronic communication user. Accordingly, the system 100 may function to evaluate electronic communications (data) exchanged and/or shared between a plurality of communication nodes (thousands to millions of communication nodes) and evaluate the activities of communication nodes with the electronic communications environment to determine one or more classifications that are line with propensities of the of users associated with or operating the communication nodes and one or more classifications that may estimate a trade or occupation of users associated with the communication nodes. Once the one or more classifications of the communication nodes have been identified by the system 100, the system 100 may additionally generate networking mappings (e.g., social networking maps, affinity networking maps, etc.) of the communication nodes that establish communication (and/or relationship) connection pairs of communication nodes. The system 100 may function to use the network mappings of communication nodes to generate user interface tools that may be used to expedite communications (e.g., communication routing, efficient electronic communication composition, etc.) thereby improve an electronic communication environment.

The electronic communication integration server 112 of the platform 110 preferably functions to extract electronic communications, such as email communications from the plurality mail servers 120. In many embodiments, the electronic communication integration server 112 functions as a proxy server (or API server) capable of interfacing with a plurality of email servers for directing email communications to and from the plurality of email servers to corresponding user email accounts and client devices. Additionally, the electronic communication integration server 112 may additionally interface with any type of electronic communication server or platform including chat communication servers, text messaging communication servers, social networking communication servers, and the like. The email communications extracted from the mail servers 120 may be associated with one or more user accounts or one or more user devices configured to transmit and receive electronic mail communication using the electronic communication integration platform 110.

The electronic communication integration server 112 may extract email communications on a periodic or continuous basis (e.g., in real-time or near real-time). Additionally, or alternatively, the electronic communication integration server 112 may extract email communications based on a request by a user client device or an indication by the plurality of mail servers 120 that email communications are available for extraction. Additionally, or alternatively, the electronic communication integration server 112 may automatically receive email communications from the plurality of mail servers 120 without expressly making an extraction request or the like. The automatic transmission of email communications from the plurality of mail servers 120 to the electronic communication integration server 112 may be based on a predetermined or dynamic schedule negotiated between the electronic communication integration server 112 and the plurality of mail servers 120.

Additionally, the electronic communication integration server 112 in cooperation with the overlay module 116 functions to generate overlay data for an email communication and, functions to store the generated overlay data for the email communication. Preferably, the electronic communication integration server 112 functions to permanently store the overlay data so long as the associated email communication persists within the mail server (e.g., mail servers 120).

Upon receipt by the electronic communication integration server 112 of an email communication request (e.g., request for email list of a recipient user) from one or more of the plurality of communication nodes 130, the electronic communication integration server 112 functions to pull or extract email communications from the plurality of mail servers 120. Specifically, the email communication request from the communication nodes 130 may include user identification information that allows the electronic communication integration server 112 to correspond the user identification information to an email communication account at the one or more of the plurality of mail servers 120.

Once the electronic communication integration server 112 receives the email communications from the plurality of mail servers 120, the electronic communication integration server 112 functions to generate overlay data for the email communications and join or integrate the generated overlay data to the email communications thereby generating integrated email communications. Following, the electronic communication integration server 112 functions transmits the integrated email communication via a communication network to a communication node 130 of the recipient user requesting the email communications.

In a preferred embodiment, the electronic communication integration server 112 may function to generally monitor and collect or analyze the electronic communications exchanged between the plurality of communication nodes 130.

The electronic communication integration server 112 may be implemented via one or more computing servers. Additionally, or alternatively, the electronic communication integration server 112 may be implemented via a distributed computing network (e.g., the cloud). It shall be noted that while, the electronic communication integration server 112 is preferably implemented and maintained by a separate entity different from an entity maintaining the plurality of mails servers 120, in some embodiments, the electronic communication integration server 112 and mail servers 120 may be maintained or implemented by a same entity or may be combined into a single computing server.

The machine learning system 114 of the electronic communication platform 110 may function to recommend or suggest classifications (e.g., labels) of communication nodes. The machine learning system 114 may implement a trained machine learning model or an ensemble of trained machine learning models that function to use as machine learning input any electronic communication data and communication node data (including node activity data) of the system 100 to identify suitable classifications. The machine learning system 114 may suggest or recommend archetype classifications and potentially additional labels (e.g., trade or occupation labels) for a communication node based on attributes and/or features of the electronic communication data (e.g., messaging data) associated with the communication node.

An archetype classification, as referred to herein, generally relates to a predetermined model that represents a type of user and/or communication node that may operate in an electronic communication environment. The predetermined model may be defined by a combination of identified patterns and attributes that exemplify a quintessence of a user and/or a communication node of the environment. In some embodiments, a determination of an archetype classification may be accomplished via one or more archetype classification machine learning models that function to predict or estimate an archetype classification for a user and/or a communication node based on electronic communication data associated therewith, as described in U.S. Application Ser. No. 62/581,243, which incorporated in its entirety herein by this reference. In a further embodiment, a determination of an archetype classification may be accomplished via one or more archetype classification heuristics defined by the predetermined model. In such further embodiment, characteristics and/or attributes of the electronic communication data of a user and/or communication node operating in the electronic communication environment may be compared to and/or filtered through the archetype classification heuristics to determine a probable or percentage match.

In the system 100, a plurality of archetype classifications may be employed where each archetype classification is preferably defined by a distinct predetermined model and/or dynamic model (e.g., continually improving model based on new training inputs). It shall be noted that an archetype classification may evolve based on changes and/or evolutions of the users and/or communication nodes within an electronic communication environment and their associated electronic communication data. As the users and/or communication nodes evolve the electronic communication data associated with these actors may also evolve enabling the system 100 to redefine or retrain the predetermined models defining an archetype.

A trade or occupation classification or label, as referred to herein, generally relates to an estimation or suggestion of a probable trade or occupation of an actor (e.g., user, person, and/or device) operating within the electronic communication environment. An actor, as referred to herein, may broadly refer to a user, person, and/or device that may be classified according to the one or more systems and/or methods described herein. A user and/or device may work individually or in combination within the electronic communication environment and may jointly or individually be referred to as a communication node when operating within the electronic communication environment. The generation and/or calculation of the trade or occupation classification or label may be based on electronic communication data associated with the actor. A determination of a trade or occupation classification or label may be determined in a manner similar as an archetype classification by using one or more machine learning models or predetermined heuristics.

Additionally, the machine learning system 114 may function to train one or more machine learning models via a machine learning training engine. The machine learning training engine may include a variety of selectable training algorithms, hyperparameters, training data, and the like that may be used in one or more machine learning training processes. Additionally, the machine learning system 114 may function to identify or classify features of the accessed or collected electronic communication data. The machine learning system 114 may be implemented by one or more computing servers having one or more computer processors (e.g., graphics process units (GPU), central processing units (CPUs, MCUs, etc.), or a combination of web servers (e.g., public or Internet servers) and private servers) that may function to implement one or more ensembles of machine learning models. The ensemble of machine learning models may include multiple machine learning models that work together to identify communication node groupings and classify features of the node groupings. The machine learning system 114 may function to communicate via one or more wired or wireless communication networks. The machine learning system 114 may additionally utilize input from various other data sources (e.g., outputs of system 100, system 100 derived knowledge data, external entity-maintained data, etc.) to continuously improve or accurately tune weightings associated with features of the one or more of the machine learning models of the system 100.

The machine learning system 114 may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in detecting cohorts of communication nodes and/or other data relevant to system 100.

The grouping engine 118 includes a grouping server that is in operable communication with the machine learning system 114 and a grouping database. The grouping engine 118 may enable cohort detection functionality that enables the grouping server to generate or suggest one or more groups or individuals based on outputs of the machine learning system 114. Additionally, or alternatively, the cohort detection functionality may be implemented to identify any type of appropriate affiliation based on identified electronic communications. Some example affiliations include, but should not be limited to, any associate of a recipient of the communication, one or more known or prospective collaborators of the recipient, one or more teams (e.g., baseball team, legal team, marketing team, etc.) associated with the recipient, and the like. Specifically, the grouping engine 118 functions to generate or receive an analysis of an inbound email communication and based on the analysis, determine one or more cohorts including one or more persons and/or groups that a user should evaluate for a potential chat communication session. These identified one or more persons and/or groups may be associated or linked to a recipient user of an email as a cohort, associate, team, and/or collaborator.

The plurality of mail servers 120 may include a plurality of mail servers or electronic communication servers maintained by a plurality of disparate entities. The mail servers 120 may include outgoing mail servers, such as Simple Mail Transfer Protocol (SMTP) servers, and incoming mail servers, such as Post Office Protocol (POP3), Internet Message Access Protocol (IMAP), and modern application programming interfaces (API), such as a Representational state (ReST) API. The plurality of mail servers 120 should not be limited to the example mail servers described above and can be encompassed by any suitable mail server or electronic communication server.

The plurality of communication nodes 130 may include one or more user client devices connected over a network (e.g., the Internet, LAN, etc.) to the electronic communication integration platform no. Additionally, it shall be noted that in some embodiments, a communication node may be an individual or entity that is not a user of the system 100 or intelligent safe platform (as described below). Thus, a non-user communication node may be networked to one or more user communication nodes but may not necessarily be a user of platform implemented by system 100 or the like. The plurality of communication nodes 130 may include any type of device capable of receiving and presenting a content of an electronic communication (e.g., an inbound email communication to a user). For instance, the plurality of communication nodes 130 may include, but are not limited to, mobile computing devices (e.g., mobile phones, tablets, etc.), desktop computers or laptops, virtual and/or personal assistant devices (e.g., Alexa, Google Home, Cortana, Jarvis, etc.), chatbots or workbots, etc. Thus, in some embodiments, the communication node may be a combination of an electronic communication user and a computing device that may be used for implementing electronic communications. An intelligent personal assistant device (e.g., Alexa, etc.) may be any type of device capable of touchless interaction with a user to performing one or more tasks or operations including providing data or information and/or controlling one or more other devices (e.g., computers, email interfaces, etc.). Thus, an intelligent personal assistant may be used by a user to perform any portions of the methods described herein, including the steps and processes of method 200 and/or method 300, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task of a communication node including, but not limited to, acquiring and providing information (e.g., email data) and performing one or more control operations (e.g., triggering a communication composition, chat request or chat session etc.). The plurality of communication nodes 130 may be operable to implement an email client application or email browser that enable the communication nodes 130 to receive, interact with, and transmit email communications.

2. Intelligent Safe Platform

One or more embodiments of the present application are preferably implemented via an intelligent safe platform. In some embodiments, the intelligent safe platform may be implemented by the system 100, described above, or any variations thereof. The intelligent safe platform, as implemented according to the one or more embodiments described herein, generally functions to collect raw data (and/or sometimes pre-processed data), interpret and obtain comprehensible insights from the raw data (e.g., historical electronics communication data, etc.) to generate useful and intelligible platform components and/or resources, and use one or more of the platform components and/or resources to enable the connection of two or more previously unconnected nodes via searching (e.g., activating or finding best paths between to indirectly or unconnected nodes), sorting, mapping, and the like.

In use, the intelligent safe platform preferably functions to generate or build a node connection graph that identifies a series of connections between nodes, a series of explicit and emergent cohort groups within the graph, relationship and responsiveness measures of and between nodes, and varying perspectives of nodes of the graph. In this way, the resultant node connection graph may be used as an intelligent reference and/or an intelligent input for determining a path between any two disparate nodes within an electronic communication environment and/or online networking environment.

2.1 Target Node Searching

Accordingly, intelligent safe platform functions to provide a user interface that enables a search of a target node. Provided a search query, beginning from an identified source, the intelligent safe platform may function to generate a path from the identified source node to a target node. The source node may be an individual user, a person, a cohort, or a team from which a search of the target node is made. The source node may function as an initial node in a generated path to the target node or terminal node in the generated path. The target node may similarly be an online user, an online device, online agent, person, or a team that is a subject of a search via the intelligent safe platform.

Search query input may include any suitable search parameters that reasonably identify a target node. The search query may include, for instance, a name of a user, a person, a cohort, a company, a classification label, or the like, which is the subject of the search. Additionally, the search query may include other descriptors of a user, a person, a cohort, a company, and the like that may be used by the intelligent safe platform to refine or constraint the search parameters thereby enabling a return of search results having a higher accuracy relative to a search having a limited or less search parameters. The other descriptors may include, but are not limited to, a target behavior (e.g., Maven, Connector, etc.), a target location, a target job title, a target expertise (e.g., lawyer, entrepreneur, etc.), a target hobby, function of a team (e.g., sales team), interests, and the like.

A search query input may also enable a selection or identification of a source. In some embodiments, the intelligent safe platform functions to enable the selection of a source from a plurality of sources. The plurality of sources from which a selection can be made may include, a user making the search query, a team (e.g., a collection of nodes that is formally or informally identified as a team within an entity), a cohort (e.g., a machine learning determined group of nodes sharing a common feature or attribute based on electronic communication data), a person, and the like.

Additionally, or alternatively, the search query may be an implicit search query or an express search query. An implicit search query, as referred to herein, generally relates to a search query provided by a user without a structured format. Thus, a user may be able to communicate the query in either conversational input (i.e., either voice or textual conversational input) and the intelligent safe platform may function to process the conversational input (by performing slot identification and the like) to identify terms within the implicit search input that can be used to return results. For instance, a user may input "what connectors do I know in San Antonio?" and the system may function to identify the term "connectors" and the terms "San Antonio" as searchable slot values. These searchable slot values may be converted into formal queries against one or more databases (or external data resources accessible to the platform) of the intelligent safe platform.

Alternatively, an express search query, as referred to herein, generally relates to a search query provided by a user using a structured format. The structured format may be a format specified by the intelligent safe platform that requires specific search parameters or values for performing the search of the target node. For instance, the intelligent safe platform may specify that a name, geographic location, and a job or trade title of the target node are required search parameters for performing a search of a target node.

2.2 Intelligent Safe Platform Derived Search Resources/ Components

Figure 3:
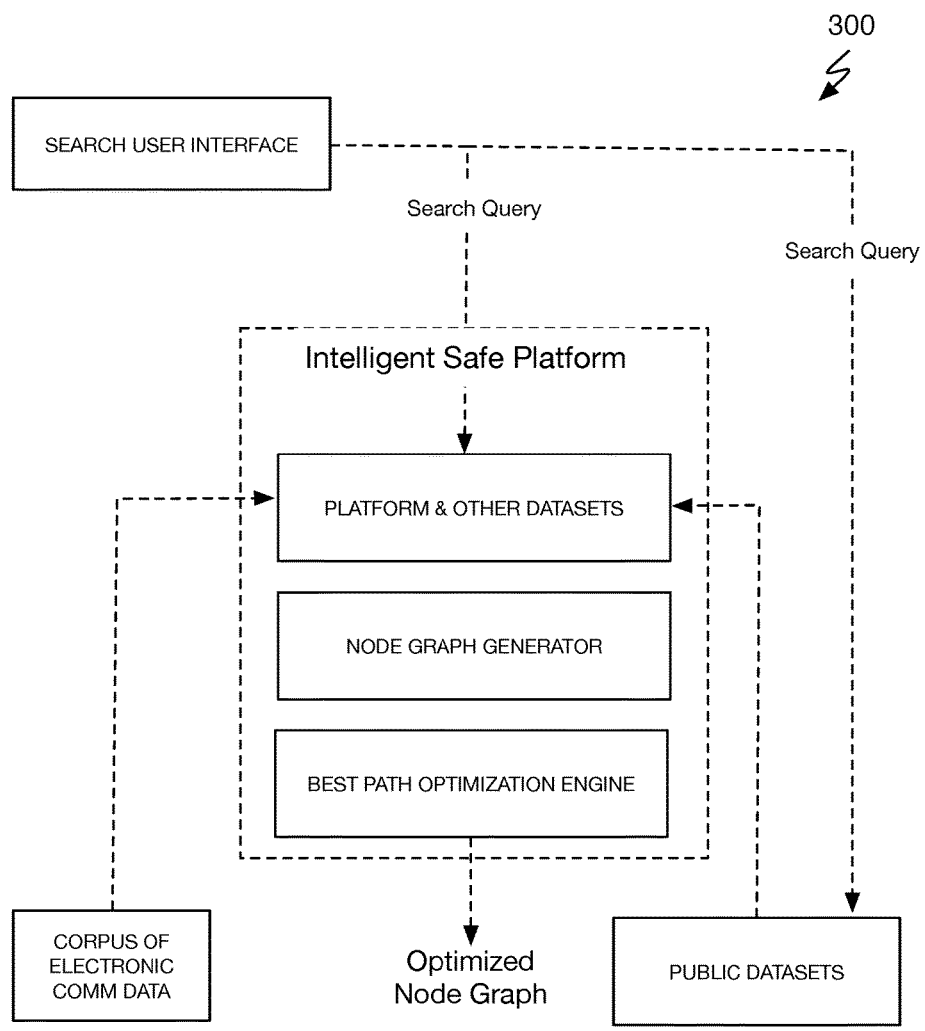
FIG. 3 illustrates a method 300 in accordance with one or more embodiments of the present application.

In a preferred embodiment, the intelligent safe platform functions to generate a plurality of platform-specific searchable resources. Specifically, the intelligent safe platform, as shown by way of example in FIG. 3, functions to collect raw data, such as historical electronic communication data, and transform the raw data into a plurality of useful and searchable platform resources that may be used for identifying a target node and a best path to the target node.

2.2.1 Cohort Generation

As described in U.S. Patent Application No. 62/581,215, which is incorporated by reference in its entirety by this reference, an explicit and/or emergent cohort of nodes (e.g., teams) may be identified using electronic communication data history of each of the nodes.

Accordingly, the intelligent safe platform may function to evaluate raw electronic communication data history of a plurality of nodes and identify subsets of those nodes that are cohorts based on a commonality or common feature between the nodes based on the evaluation of the raw electronic communication data.

In a preferred embodiment, the intelligent safe platform may function to evaluate the raw electronic communication data associated with a plurality of nodes and derive from the raw electronic communication data an indication or measure of a relationship between two disparate nodes and a relationship strength metric for each identified relationship. Generally, the relationship strength may be any type of value or measure that may be used to identify a level of connection or level of association between two nodes. The relationship strength may be derived by the intelligent safe platform by normalizing the raw electronic communication data of a given node to generate a node-specific normalized electronic communication scale. The intelligent safe platform may function to compare the electronic communication data history between the given node and any other node to the scale to determine a relationship strength between the given node and the other node. As an example, a subject node may on monthly average share one hundred (100) email communications with other nodes in an identified cohort of nodes. Evaluating the relationship strength of the subject node and a second node of the cohort, it may be detected that the subject node and the second node may only share twenty email communications based on a monthly average. Thus, the intelligent safe platform may function to compare the monthly average email communication of 20 between the given node and the second node to the normalize monthly average of the given node of 100. The resulting analysis may indicate that the given node communicates with the second node eighty percent (80%) less than the given node communicates with other nodes in the cohort. Because the given node communicates with the second node less than the normalized monthly communication average of the given communication node and at or below a specific communication threshold, the platform may calculate a low relationship strength value between the given node and the second node. In some embodiments, a calculated communication frequency between the given node and the second node may be used as an input value into a connection strength algorithm or the like. Accordingly, using the connection strength algorithm, a connection strength between the given node and the second node may be derived.

Figure 5:
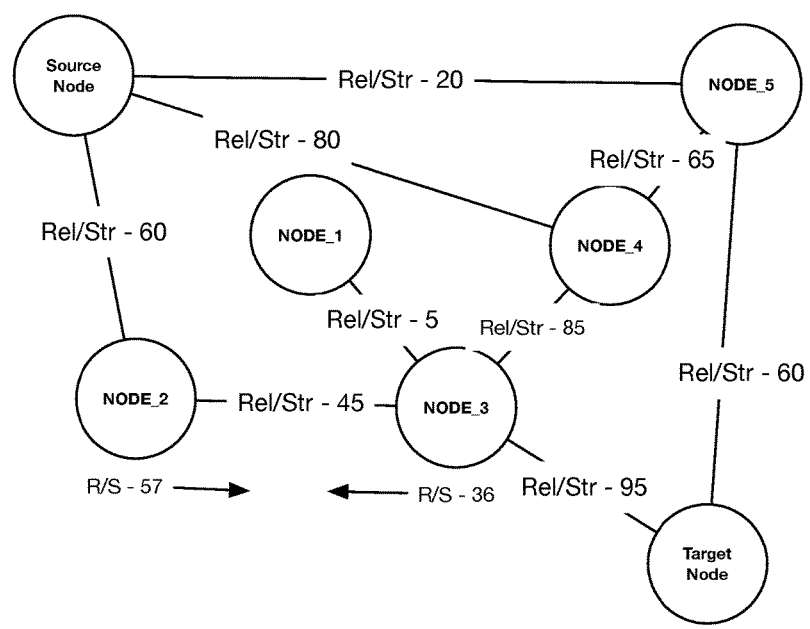
FIG. 5 illustrates an example schematic of a weighted node graph for implementing portions of a method in accordance with one or more embodiments of the present application.

Additionally, as further illustrated in FIG. 5, the relationship link or edge between two nodes may include bi-directional weights or strength metrics that indicate a relationship or connection metric from the perspective of a first node toward a second node and similarly, from the perspective of the second node to the first node. As an example, an overall relationship strength between Node 2 and Node 3 may be calculated as Rel/Str-45; however, a calculated relationship strength from the perspective of Node 2 toward Node 3 may be R/S-57 while a calculated relationship strength from the perspective of Node 3 toward Node 2 may be R/S-36. The difference in the value of the bi-directional relationship metrics between Node 2 and Node 3 may be based on an assessment or evaluation of the raw communication data transmitted between the two nodes and, in some embodiments, between the two nodes and other nodes having a link or edge to at least one of the two nodes. For instance, Node 2 may transmit communications to Node 3 with a higher frequency than Node 3 transmits communications to Node 2 thereby enabling a higher relative relationship strength from the perspective of Node 2 to Node 3.

Figure 4:
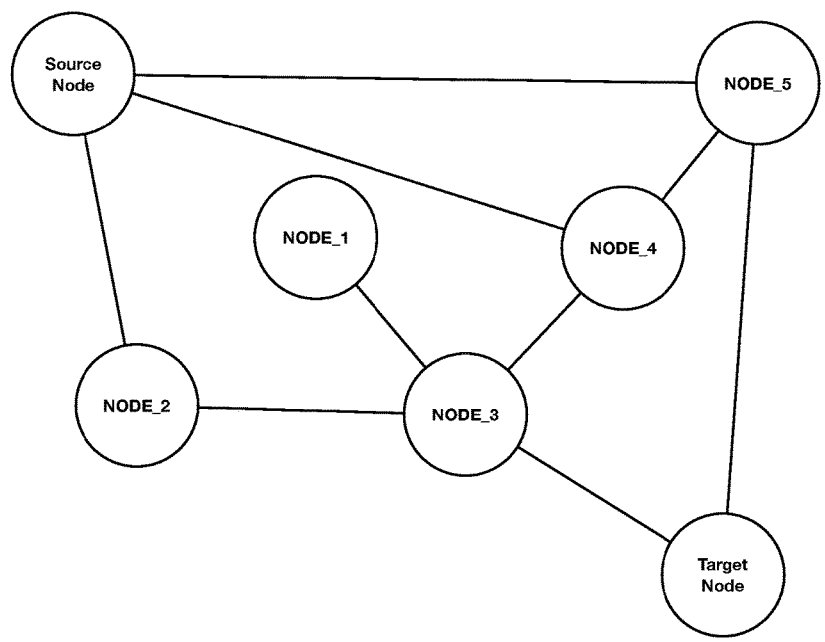
FIG. 4 illustrates an example schematic of a node graph for implementing portions of a method in accordance with one or more embodiments of the present application.

In some embodiments, the cohort group of nodes may be illustrated as a node graph by the intelligent safe platform, as shown by way of example in FIG. 4. In such embodiments, each of the nodes of a cohort may be represented as a point or object on the graph and the relationship between certain nodes in the cohort represented as a link (or edge). In the node graph, the relationship strength between two disparate nodes may be shown as a normalized value (e.g., 20) attributed to the edge (connection link) between the nodes, as shown by way of example in FIG. 5.

Additionally, the intelligent safe platform may function to evaluate the raw electronic communication data associated with a plurality of nodes and derive from the raw electronic communication data a responsiveness value. The responsiveness value preferably indicates a level of responsiveness of a first node to a second node to an electronic communication received by the first node from the second node. A responsiveness value may be determined for any node that receives an electronic communication from another node. Preferably, the responsiveness value is attributable to subject node that is being evaluated (i.e., the responding node) and a distinct responsiveness value may be calculated from the direct perspective of the second node towards the first node. Accordingly, when represented graphically, a node graph having the first node and the second node may have two responsiveness values (from the perspective of each of the two nodes) on the edge that links the first node and the second node.

Additionally, the intelligent safe platform may function to identify a normalized responsiveness to a cohort. While the platform may function to generate normalized responsiveness values between any two nodes in a cohort or the like, the platform may additionally function to generate a node-specific normalized responsiveness to a cohort of a subject node. The cohort normalized responsiveness value for a subject node may generally relate to a level of responsiveness of the subject cohort to a specific cohort of which the subject node is a member. The cohort normalized responsiveness value may be calculated by determining an average normalized responsiveness value from the perspective of the subject node summing each of the normalized responsiveness values of the subject node and dividing the sum of the normalized responsiveness values by a total number of normalized responsiveness values existing for the subject node within the cohort. For example, if the subject node shares an edge or link with three other nodes, a normalized responsiveness value of the subject node toward the three other nodes may be aggregated or summed and divided by three.

2.2.2 Node Data Correlation

The intelligent safe platform may additionally function to generate a correlated dataset for any node or person. Specifically, the intelligent safe platform having access to the raw electronic communication data history of a node as well as derived data for the node (e.g., collectively "platform data") may additionally function to associate publicly available data with the node thereby generating a larger correlated dataset that includes both platform data and publicly available data. That is, the intelligent safe platform may function to identify publicly available data that may be associated with a node, verify that the publicly available data actually belongs to or is associated with the node, and once verified, the intelligent safe platform may function to generate an electronic association between the platform data for a node and the publicly available data for the node and further, electronically associate the combination of the platform data and publicly available data with the node.

When identifying whether publicly available data is associated with a node, the intelligent safe platform may function to selectively identify or use one or more features or data points from the raw electronic communication data of the node in a verification process of the publicly available data. For instance, if a social profile is discovered that may be associated with a node, the intelligent platform may function to sift through the raw electronic communication data of the node to identify whether any electronic communications include an intersecting or overlapping data point. An intersecting or overlapping data point may typically refer to a data point (or feature) discovered in the raw electronic communication data of a node that also matches a data point identified within publicly available data. As an example, if a social profile is discovered among publicly available data, to verify whether the social profile is associated with a subject node, the intelligent platform may use one or more data points of the social profile (e.g., convert publicly available data points to a search query or probe) to perform a search of the raw electronic communication data of the subject node. If any intersecting data points exists, such as an email used as a contact for the social profile and an email contact belonging to or associated with the subject node matches, then the intelligent platform may function to verify the social profile and the data therein as belonging to or being associated with the subject node. With the discovery of additional (e.g., more than one) intersecting or overlapping data points, the higher the probability of match between the publicly available data and the platform data of a subject node.

2.2.3 Perspective Generation

As a representation of the relationships and responsiveness of nodes determined to be members of a cohort or a team, the intelligent safe platform may function to generate one or more node graphs or the like that illustrate each node of a cohort and/or team and the edges (or links) between pairs of nodes within the node graph. As mentioned above, the intelligent safe platform may function to augment the node graph to include determined relationship strengths between nodes and responsiveness of nodes to other nodes within the cohort or team. It has been discovered that the addition of new nodes to an existing node graph (e.g., a cohort, a team, etc.) may function to affect the prior strength of relationship values and responsiveness values of the prior nodes of the node graph.

That is, as a new node is added to an existing node graph (e.g., a node network mapping, etc.), some or all of the perspective values, strength of relationship values, and responsiveness values associated with the node may be assimilated into the existing node graph. Thus, the addition of a new node to an existing node graph may function to strength and/or increase the accuracy of the edge value estimations (e.g., strength of relationship) and responsiveness values by augmenting the raw electronic communication data available to the intelligent safe platform for calculating the aforementioned calculated values of the node graph.

Additionally, the intelligent safe platform may function to identify a (direct or indirect) perspective of each node in a node graph of a specified relationship existing in the node graph or of a specified node. Specifically, for an edge or relationship that is defined within a cohort, team, or related group of nodes, the intelligent safe platform may function to generate a perspective on that edge or relationship for a node that is external (i.e., indirect perspective) to that relationship and that is preferably within the group of nodes. For instance, as illustrated in FIG. 5, Node 2 may have a direct relationship perspective R/S–57 towards Node 3 and Node 3 may have a direct relationship perspective of R/S–36 towards Node 2. In such instance, each of Nodes 1, 4, and 5 (i.e., nodes external to the direct relationship) may have an indirect perspective on the relationship strength between Node 2 and Node 3. The indirect perspective of the external node on the specified relationship may typically be based on an evaluation of shared electronic communication data that involved the pair of nodes sharing the edge and the external node. For instance, the external node may have been copied on several email exchanges between the pair of nodes. Thus, by virtue of the external nodes involvement in one or more shared electronic communications with the pair of nodes, an indirect perspective of the external node towards the relationship of the pair of nodes may be derived from that shared electronic communications.

Additionally, the intelligent safe platform may function to identify (direct or indirect) perspectives on specific nodes (e.g., a specific person) within a node graph. In a somewhat similar manner, as described above, the intelligent safe platform may function to derive perspectives on a subject node for each node within a node graph. The derived perspectives may be based on an evaluation of electronic communication histories shared between the subject node and the disparate nodes of a common node graph.

Additionally, or alternatively, the intelligent safe platform may function to combine all perspectives on a relationship into a single combined node graph that merges the raw electronic communication history data of all nodes having a perspective on a relationship to generate global perspective on an identified relationship within a node graph or the like. The intelligent safe platform may additionally function to generate a global perspective on a node in a similar manner that merges the raw electronic communication data history of all nodes within a node graph that have a perspective on a subject node within a node graph to generate a global perspective on the subject node.

Further, the intelligent safe platform may function to combine global perspectives on relationships together with global perspectives on nodes to form a global combined perspectives node graph for a given community of nodes.

3. Method for Node Searching and Path Finding to Node

Figure 2:
FIG. 2 illustrates a schematic of an intelligent safe platform in accordance with one or more embodiments of the present application.

As shown in FIG. 2, a method 200 for searching a target node and identifying an optimal or best path to the target node includes receiving a search query S210, identifying one or more datasets based on the search query S220, selecting a best path optimization algorithm S230, and identifying an optimal path from a source node to a target node based on the selected path optimization algorithm S240.

S210, which includes receiving a search query, functions to receive input of a search query for identifying a path from a source node to a target node (e.g., a person, team, a cohort, a company, etc.). The search query may be provided in any suitable format or using any suitable method including, but not limited to, as text input, as voice input (e.g., conversational input, etc.), as gesture input, as touch input, etc. The query is preferably received and processed by the intelligent safe platform described herein.

S210 may function to identify a query type of the query. The query type may include one of a granular search query (e.g., an explicit search) and a coarse search query. A granular search query of a target node may include a query that specifically identifies a target node by one or more specifically identifiable attributes, such as by a name, a title, a location, a company, a cohort grouping, a team, and/or the like. A coarse search query of a target node may include a query that broadly identifies a target node by an archetype label (e.g., behavioral label, Maven, Connector, etc.), by an expertise or trade label (e.g., Lawyer, entrepreneur, sales person, etc.), and the like. It shall be noted that, in some embodiments, a search query may include a combination of a granular search query and a coarse search query.

Additionally, or alternatively, S210 may function to identify the one or more search facets of the received search query and use the one or more search facets to perform a search of platform datasets as well as publicly available datasets. Thus, in some embodiments, the one or more search facets of the received search query may function as search parameters. A search facet, as referred to herein, may typically refer to a search term or feature that enables a user to access information organized according to a faceted or multi-faceted (e.g., labeled datasets, etc.) classification system. Example search facets may include, but should not be limited to, outlier detection behavior labels (e.g., Connectors, Mavens, etc.), machine learning content based expertise labels (e.g., Lawyer, Entrepreneur, Technologist, etc.), titles (e.g., job, trade titles, etc.), geographic location, team and/or cohort, public data correlated to a node (e.g., publicly available node profile data, etc.), user-provided and/or user-saved profiles, and the like.

S220, which includes identifying one or more datasets based on the search query, functions to use the identified search facets of a search query to identify platform datasets and/or publicly available datasets. The platform datasets may include a plurality of node graphs or pre-established mappings of nodes in which nodes are networked together based on an evaluation of historical electronic communication data and, in some embodiments, based on publicly available data. Each of the node graphs and/or mappings of nodes may include one or more classifications (e.g., behavioral labels, expertise labels, etc.) of each node, cohort, or team, one or more perspectives on each node, cohort, or team, one or more strength of relationship values or metrics between each pair of nodes, one or more responsiveness values for each node, and the like. Each node of the node graphs or mappings of nodes may additionally be electronically associated with machine-determined or user provided profile data and the like. Accordingly, the identify search facets of the received search query may be used to filter through the available datasets (e.g., node graphs, mappings of nodes, node profiles, etc.) of the intelligent safe platform and used as search probes to identify publicly available datasets that may be verified using platform data.

As an example, a user selecting herself as a source node may provide a search query of "what connectors do I know in San Antonio, Tex.?". S210 receiving this search query may identify this query as a mixed granular and coarse search query based on identifying the term "connectors" in the search query as a recognized broad behavioral label search facet and identifying the terms "San Antonio, Tex." in the search query as a granular (or specific) location search facet. In such example, S220 may then use the search facets of "connectors" and "San Antonio, Tex." to identify one or more relevant datasets within the platform and if applicable, publicly available datasets. For instance, S220 may function to use the search facet "connectors" to identify all nodes labeled as connectors that are directly or indirectly linked to the source node. The direct links indicating a direct relationship between the source node and a connector and the indirect links indicating an indirect relationship between the source node and the connector that is established with intermediary nodes. S220 may function to represent the relationship of the source node to the identified connectors as a node graph illustrating the source node and its direct and indirect relationships to all of the identified connector nodes.

Additionally, S220 may use the location search facet of San Antonio, Tex. to further filter through the platform datasets to thereby identify only those connectors that share a direct and/or indirect links with the source node. Accordingly, in the above example, a node graph may include the connections (e.g., direct and indirect) between the source node and Connectors located in San Antonio, Tex. Additionally, or alternatively, to further refine the search to active nodes within a specific or designated cohort, the search query may be "what connectors do I know active in San Antonio, Tex." such that the platform identifies only those nodes that have been actively sharing or exchanging electronic communications.

It shall be noted that, while in the above example the search facet for identifying the Connectors was applied first, the search facets may be applied in any order to locate and filter the available datasets.

Once a node graph or mapping of nodes (alternatively, node mapping) is identified in S220, S230, which includes selecting a best path optimization algorithm, functions to receive a selection of a best path optimization between the source node and a target node. That is, a system implementing the method 200 may function to apply a selected one or more of plurality of best path optimizations to the identified node graph to generate a desired best path from the source node to the target node. The plurality of best path optimizations may include a best path optimization based on relationship strength metrics, behavior or expertise based labels (e.g., Mavens, Connectors, Lawyer labels, etc.), responsiveness metrics, and/or any available metric applied to a node graph.

A selection of a best path optimization may be identified based on an express selection by a user or an implied selection by a user. For instance, contemporaneous with a submission of a search query, a user may expressly indicate a best path optimization using relationship strengths, such that a best path from the source node to the target node of the resulting node graph or mapping is generated based on a path from the source node having the highest average relationship strength.

Alternatively, the selection of the best path optimization may be identified implicitly based on an evaluation of the search query data. For instance, a user may submit the search query: "what is the quickest way that I can connect with John Doe?" In such example, S240 may function to interpret an implicit best optimization path selection of the search query to be based on responsiveness of the nodes in a resulting node graph. As the responsiveness metric applied to the nodes of a node graph may be dispositive of how quickly nodes within the graph may function to respond to a request to connect the source node to the target node.

Additionally, or alternatively, S240 may function to recommend or suggest an optimal best path optimization based on objectives of the search query and/or based on identifying the best path optimization having a highest probability of success based on relationship metrics and responsiveness metrics between the source node and the target node.

S240, which includes identifying an optimal path from a source node to a target node based on the selected best path optimization, functions to apply the selected best path optimization to an identified or resulting node graph of a search query. Specifically, S240 may function to implement a specific optimization algorithm associated with the selected best path optimization.

Figure 6:
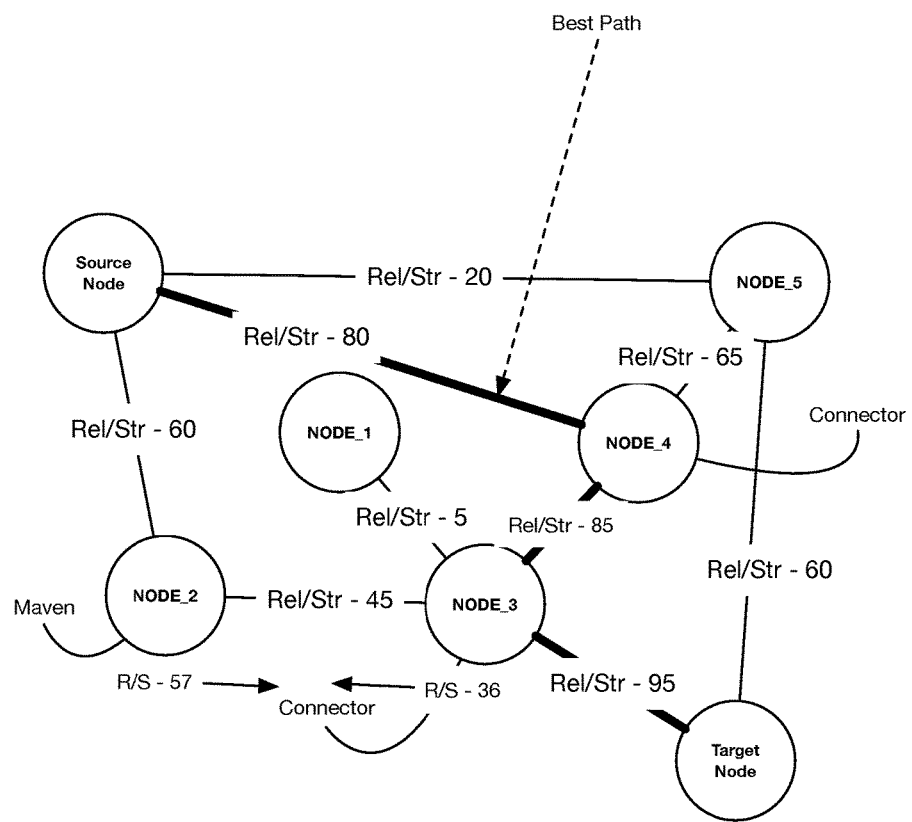
FIG. 6 illustrates an example schematic of a node graph having an optimal path for implementing portions of a method in accordance with one or more embodiments of the present application.

As shown by way of example in FIG. 6, if a best path optimization using relationship strengths is expressly or implicitly selected, S240 may function to identify each edge that exists between each pair of nodes of the node graph and also, identify a relationship strength metric for each of the edges of the node graph. S240 may additionally function to identify the bi-directional or asymmetrical relationship metrics or values from the perspective of each node in the node graph as an additional input for evaluating and/or determining suitable paths from a source node to a target node. For each of the possible paths between the source node and the target node, S240 may function to aggregate the relationship strength values (e.g., direct R/S values, indirect R/S values, asymmetric R/S values, etc.) assigned to each edge and/or node of a given potential path and determine an average relationship strength value for the given potential path. Thus, S240 may function to identify an average strength of relationship for each of the potential paths from the source node to the target node of the node graph.

Once an average strength of relationship value is calculated for each possible path of a node graph, S240 may function to rank each of the potential paths based on the calculated average strength of relationship values. In the case, that two or more paths share a same average strength of relationship value, S240 may function to further calculate a probability of success for each of the two or more paths based on other factors including responsiveness of the nodes within the path and the like.

In another implementation, if the selected best path optimization requires using responsiveness metrics, S240 may function to perform a similar path identification and average responsiveness calculation for each of the identified potential paths of a node graph.

In a further implementation, if the selected best path optimization is based on behavioral and/or expertise labels of the nodes within the node graph, S240 may function to identify a best path from the source node to the target node based on a path within the node graph that includes a highest number of a selected behavioral or expertise label (e.g., Connector). Additionally, or alternatively, S240 may function to calculate a probability of success for each of the paths being routed through the selected behavioral or expertise tags.

Additionally, or alternatively, once an optimal or best communication path to a target node identified in search is determined or identified, S240 may further enable a selective sharing of a given network mapping associated with the communication node that initiated the search. For instance, a subject node may selectively enable or disable a sharing of a network or a network mapping associated with the subject node with a target node or any given node within a network of the subject node. The subject node may selectively enable or disable sharing on an individual node basis, on a domain basis, on a company (or business entity) basis, on a cohort basis, and/or any other suitable basis conceivable within the platform.

Additionally, or alternatively, a networking mapping may be extended beyond a second degree of connectivity, such that a third degree or beyond of connectivity for a given subject node may be illustrated or provided within a network mapping. In some embodiments, because a third degree connection within a network mapping of a given node may be attenuated, the method 200 may function to include privacy controls within a network mapping of a subject node to limit the data and/or information that is visible or accessible to the subject node. That is, while a third degree connection may be included or shown within a network mapping of a subject node, it may not be possible for the subject node to interact with the third degree node, but for through an intermediate node that has a direct or second degree connection with the third degree node. Accordingly, in such embodiments, a subject node may require a direct or at a minimum a second degree connection with an intermediate node to establish a communication path to the third degree (or beyond) connection.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the claims.

What is claimed is:

1. A system that implements an electronic network mapping of online communication nodes within an online communication service, the system comprising:
an online electronic communications service implemented via a distributed networked computing system comprising an electronic communications server that accesses electronic communication data exchanged between a plurality of online users;
at the online electronic communications service:
receiving, via an online user interface of the online electronic communications service, a search query from a source communication node;
accessing historical electronic communication data associated with the source communication node and a plurality of online communication nodes from one or more third-party online communication services, the historical electronic communication data comprising data relating to communications exchanged between two or more online communication nodes operating on the one or more third-party online communication services;
constructing, by the online electronic communications service, an electronic communication network mapping of communication nodes between the source communication node and each of the plurality of online communication nodes based on the historical electronic communication data, wherein constructing the electronic communication network mapping includes:
measuring a plurality of communication metrics and/or a plurality of connectivity metrics among the source communication node and the plurality of online communication nodes based on the historical electronic communication data;
attributing at least one communication metric or at least one connectivity metric between pairs of online communication nodes within the electronic communication network mapping based on the measuring; and
returning, via the online user interface of the online electronic communications service, an identification of one or more online communication nodes that satisfy one or more search facets of the search query based on the electronic communication network mapping.

2. The system according to claim 1, further comprising:
at the online electronic communications service:
identifying an optimal communication path via the electronic communication network mapping from the source communication node to a selected one of the identified one or more online communication nodes.

3. The system according to claim 2, wherein
identifying the optimal communication path includes identifying one electronic communication path from a plurality of possible electronic communication paths within the electronic communication network mapping having an average responsiveness metric value that satisfies a predetermined threshold;
calculating the average responsiveness metric value includes:
aggregating each of a plurality of distinct responsiveness metric values attributed to pairs of online communication nodes along each of the plurality of possible electronic communication paths within the electronic network mapping; and
calculating the average responsiveness metric value for each of the plurality of possible electronic communication paths based on a number of distinct responsiveness metric values along each of the plurality of possible electronic communication paths.

4. The system according to claim 2, wherein
identifying the optimal communication path includes identifying one electronic communication path from a plurality of possible electronic communication paths within the electronic communication network mapping having an average relationship strength metric value that satisfies a predetermined threshold;
calculating the average relationship strength metric value includes:

aggregating each of a plurality of distinct relationship strength metric values attributed to pairs of online communication nodes along each of the plurality of possible electronic communication paths within the electronic communication network mapping; and calculating the average relationship strength metric value for each of the plurality of possible electronic communication paths based on a number of distinct relationship strength metric values along each of the plurality of possible electronic communication paths.

5. A method that implements an electronic network mapping of online communication nodes within an online communication service, the method comprising:

implementing an online electronic communications service via a distributed networked computing system;

at the online electronic communications service:

receiving, via an online user interface of the online electronic communications service, a search query from a source communication node;

accessing historical electronic communication data associated with the source communication node and a plurality of online communication nodes from one or more third-party online communication services, the historical electronic communication data comprising data relating to communications exchanged between two or more online communication nodes operating on the one or more third-party online communication services;

constructing an electronic communication network mapping of communication nodes between the source communication node and each of the plurality of online communication nodes based on the historical electronic communication data, wherein constructing the electronic communication network mapping includes:

measuring a plurality of communication metrics and/or a plurality of connectivity metrics among the source communication node and the plurality of online communication nodes based on the historical electronic communication data;

attributing at least one communication metric or at least one connectivity metric between pairs of online communication nodes within the electronic communication network mapping based on the measuring; and returning, via the online user interface of the online electronic communications service, an identification of one or more online communication nodes that satisfy one or more search facets of the search query based on the electronic communication network mapping.

6. The method according to claim 5, further comprising:
identifying an optimal communication path via the electronic communication network mapping from the source communication node to a selected one of the identified one or more online communication nodes.

7. The method according to claim 6, wherein
identifying the optimal communication path includes identifying one electronic communication path from a plurality of possible electronic communication paths within the electronic communication network mapping having an average responsiveness metric value that satisfies a predetermined threshold;

calculating the average responsiveness metric value includes:

aggregating each of a plurality of distinct responsiveness metric values attributed to pairs of communication nodes along each of the plurality of possible electronic communication paths within the electronic network mapping; and calculating the average responsiveness metric value for each of the plurality of possible electronic communication paths based on a number of distinct responsiveness metric values along each of the plurality of possible electronic communication paths.

8. The method according to claim 7, wherein
the average responsiveness metric value indicates a level of responsiveness of a first node to a second node to an electronic communication received by the first node from the second node.

9. The method according to claim 7, wherein
the average responsiveness metric value indicates a likelihood that an electronic message is routed efficiently through a given pair of online communication nodes within the electronic communication network mapping.

10. The method according to claim 6, wherein
identifying the optimal communication path includes identifying one electronic communication path from a plurality of possible electronic communication paths within the electronic communication network mapping having an average relationship strength metric value that satisfies a predetermined threshold;

calculating the average relationship strength metric value includes:

aggregating each of a plurality of distinct relationship strength metric values attributed to pairs of online communication nodes along each of the plurality of possible electronic communication paths within the electronic communication network mapping; and calculating the average relationship strength metric value for each of the plurality of possible electronic communication paths based on a number of distinct relationship strength metric values along each of the plurality of possible electronic communication paths.

11. The method according to claim 5, wherein
each of the online communication nodes of the plurality of online communication nodes is represented as a distinct node within a graphical representation of the electronic communication network mapping;

the method further comprising:

selecting a node comprising one of the identified one or more online communication nodes within the graphical illustration of the electronic communication network mapping; and responsive to the selecting the node, automatically presenting via an interface of an online networking environment one or more options for establishing an electronic communication with an online user and/or routing an electronic message to the online user.

12. The method according to claim 5, wherein
the electronic communication network mapping comprises a cohort network mapping that identifies electronic connections between a subset of the plurality of online communication nodes defining a cohort grouping;

the method further comprising:

implementing a machine learning system comprising an ensemble of machine learning classifiers that includes a plurality of distinct machine learning classifiers, wherein each of the plurality of distinct machine learning classifiers is configured to generate a distinct classification label upon a detection of a distinct cohort data feature extracted from the historical electronic communication data, processing the historical electronic communication data, including:

generating by the plurality of distinct machine learning classifiers one or more cohort machine learning classification labels for each of the plurality of online communication nodes based on one or more distinct cohort data features of the extracted cohort data features;

allowing the one or more cohort machine learning classification labels along with the cohort data features, as input, into a cohort grouping circuit; and identifying the cohort grouping additionally based on the one or more cohort machine learning classification labels.

13. The method according to claim 5, wherein
the electronic communication network mapping comprises an archetype network mapping that identifies an archetype classification label for each online communication node of a subset of the plurality of online communication nodes within the archetype network mapping, wherein the archetype classification label relates to a predetermined model that represents a type of online user and/or online communication node operating in an electronic communication environment;

the method further comprising:
implementing a machine learning classification system comprising an ensemble of machine learning classifiers that includes a plurality of distinct machine learning classifiers, wherein each of the plurality of distinct machine learning classifiers is configured to generate a distinct archetype classification label upon a detection of a distinct archetype data feature extracted from the historical electronic communications data, processing the historical electronic communication data, including:

generating by the plurality of distinct machine learning classifiers one or more archetype machine learning classification labels for each of the plurality of online communication nodes based on one or more distinct archetype data features of the archetype data features;

applying a global archetype classification threshold to the one or more archetype machine learning classification labels;

wherein identifying the archetype classification for each of the plurality of online communication nodes includes outputting to the archetype network mapping the archetype classification that maps to the one or more archetype machine learning classification labels that satisfies or exceeds the global archetype classification threshold.

14. The method according to claim 13, wherein
the global archetype classification threshold relates to a minimum required likelihood or probability that the archetype data features indicate an associated archetype classification label or archetype classification for each of the plurality of online communication nodes.

15. The method according to claim 5, further comprising:
implementing an electronic communication processing circuit that processes the historical electronic communication data, wherein processing the historical electronic communication data includes:

extracting, by a feature extractor circuit, communication data features and/or connectivity data features from the historical electronic communication data, wherein measuring the plurality of communication metrics and/or the plurality of connectivity metrics is based on the extracted communication data features and/or connectivity data features.

16. The method according to claim 5, wherein:
the electronic communication network mapping comprises a connectivity link or connectivity edge between disparate pairs of online communication nodes within the electronic communication network mapping, and each of connectivity link or each connectivity edge comprises bi-directional connectivity weights or connection metric values that includes a first metric value indicating a relationship metric value or connection metric value from a perspective of a first node toward a second node in a distinct pair of online communication nodes and a second metric value indicating a relationship metric value or connection metric value from a perspective of the second node toward the first node in the distinct pair of online communication nodes.

17. The method according to claim 5, further comprising:
generating a correlated dataset associated with the source communication node, wherein generating the correlated dataset includes:

identifying publicly available data from one or more Internet data sources that is potentially associated with the source communication node, determining whether the publicly available data includes data that is associated with the source communication node by identifying overlapping data points between data points within the historical electronic communication data associated with the source communication node and data points within the publicly available data;

defining the correlated dataset by correlating the historical electronic communication data associated with the source communication node and the publicly available data if the overlapping data points satisfy a predetermined overlapping threshold.

18. The method according to claim 5, further comprising:
selectively enabling or selectively disabling a sharing of the electronic communication network mapping with one or more online communication nodes operating with the online electronic communication service.

19. The method according to claim 5, further comprising:
selectively enabling or selectively disabling a sharing of the electronic communication network mapping with one or more domains and/or one or more cohort groups operating with the online electronic communication service.

20. An online method that implements an electronic network mapping of online communication nodes within an email environment based on email communication data, the online method comprising:

implementing an online electronic communications service via a distributed networked computing system;

at the online electronic communications service:
receiving, via an online user interface of the online electronic communications service, a search query from a source communication node;

accessing historical electronic communication data associated with the source communication node and a plurality of online communication nodes from one or more third-party online communication services, the historical electronic communication data comprising data relating to communications exchanged between two or more online communication nodes operating on the one or more third-party online communication services;

constructing an electronic communication network mapping of communication nodes between the source communication node and each of the plurality of online communication nodes based on the historical electronic communication data, wherein constructing the electronic communication network mapping includes:

measuring a plurality of communication metrics and/or a plurality of connectivity metrics among the source communication node and the plurality of online communication nodes based on the historical electronic communication data;

attributing at least one communication metric or at least one connectivity metric between pairs of online communication nodes within the electronic communication network mapping based on the measuring; and returning, via the online user interface of the online electronic communications service, an identification of one or more online communication nodes that satisfy one or more search facets of the search query based on the electronic communication network mapping.

* * * * *